United States Patent
Murphy et al.

(10) Patent No.: US 8,669,960 B2
(45) Date of Patent: Mar. 11, 2014

(54) FIRMWARE METHODS AND DEVICES FOR A MUTUAL CAPACITANCE TOUCH SENSING DEVICE

(71) Applicant: PixArt Imaging Inc., Hsin-Chu (TW)

(72) Inventors: Thomas Murphy, Boulder Creek, CA (US); Kevin Rathburn, Cambell, CA (US); Keen Hun Leong, Penang (MY); Sarangan Narasimhan, San Jose, CA (US)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 13/964,104

(22) Filed: Aug. 11, 2013

(65) Prior Publication Data

US 2013/0321338 A1 Dec. 5, 2013

Related U.S. Application Data

(62) Division of application No. 13/676,141, filed on Nov. 14, 2012, now Pat. No. 8,553,009, which is a division of application No. 12/547,408, filed on Aug. 25, 2009, now Pat. No. 8,334,849.

(51) Int. Cl.
*G06F 3/045* (2006.01)
(52) U.S. Cl.
USPC .......................... 345/173; 345/174; 345/175
(58) Field of Classification Search
USPC .................................................. 345/173–179
See application file for complete search history.

(56) References Cited

U.S. PATENT DOCUMENTS

| | | | |
|---|---|---|---|
| 7,411,584 B2 | 8/2008 | Hill | |
| 7,746,325 B2 | 6/2010 | Roberts | |
| 8,059,015 B2 * | 11/2011 | Hua et al. | 341/33 |
| 8,072,439 B2 | 12/2011 | Hillis | |
| 8,243,027 B2 * | 8/2012 | Hotelling et al. | 345/173 |
| 2003/0206162 A1 * | 11/2003 | Roberts | 345/173 |
| 2006/0214921 A1 | 9/2006 | Takahashi | |
| 2008/0024459 A1 | 1/2008 | Poupyrev | |
| 2008/0122799 A1 | 5/2008 | Pryor | |
| 2008/0225017 A1 * | 9/2008 | Kim et al. | 345/175 |
| 2008/0231612 A1 | 9/2008 | Hill | |
| 2009/0058828 A1 | 3/2009 | Jiang | |
| 2010/0060611 A1 | 3/2010 | Nie | |
| 2010/0289759 A1 | 11/2010 | Fisher | |
| 2010/0302201 A1 * | 12/2010 | Ritter et al. | 345/174 |
| 2011/0018832 A1 | 1/2011 | Pryor | |
| 2011/0285654 A1 * | 11/2011 | Park et al. | 345/173 |
| 2012/0157167 A1 | 6/2012 | Krah | |

* cited by examiner

*Primary Examiner* — Van Chow
(74) *Attorney, Agent, or Firm* — Winston Hsu; Scott Margo

(57) ABSTRACT

Disclosed are various embodiments of methods and devices for operating a processor or host controller in a mutual capacitance sensing device. Methods and devices for sorting motion reports provided to a host controller or other processor in a mutual capacitance sensing device, reporting touch points to a host controller or other processor in a mutual capacitance sensing device, improving noise robustness and navigation performance in a mutual capacitance sensing device, determining a touch area of a user's finger on a touch panel or touchpad of a mutual capacitance sensing device, and avoiding false wakeups and minimizing power consumption in a mutual capacitance sensing device having a touch panel or touchpad are described.

5 Claims, 11 Drawing Sheets

FIRMWARE METHODS AND DEVICES FOR A MUTUAL CAPACITANCE TOUCH SENSING DEVICE

CROSS REFERENCE TO RELATED APPLICATIONS

This application is a division of U.S. application Ser. No. 13/676,141, and claims the benefit of U.S. application Ser. No. 13/676,141, which was filed on Nov. 14, 2012 and claims the benefit of U.S. application Ser. No. 12/547,408, which was filed on Aug. 25, 2009 and entitled "Firmware Methods and Devices for a Mutual Capacitance Touch Sensing Device".

BACKGROUND OF THE INVENTION

1. Field of the Invention

Various embodiments of the invention described herein relate to the field of capacitive sensing input devices generally, and more specifically to firmware for mutual capacitance measurement or sensing systems, devices, components and methods finding particularly efficacious applications in touchscreens and/or touchpads. Embodiments of the invention described herein include those amenable for use in portable or hand-held devices such cell phones, MP3 players, personal computers, game controllers, laptop computers, PDA's and the like. Also described are embodiments adapted for use in stationary applications such as in industrial controls, household appliances, exercise equipment, and the like.

2. Description of the Prior Art

Two principal capacitive sensing and measurement technologies are currently employed in most capacitive touch sensing devices. The first such technology is that of self-capacitance. Many devices manufactured by SYNAPTICS™ employ self-capacitance measurement techniques, as do integrated circuit (IC) devices such as the CYPRESS PSOC™. Self-capacitance involves measuring the self-capacitance of a series of electrode pads using techniques such as those described in U.S. Pat. No. 5,543,588 to Bisset et al. entitled "Touch Pad Driven Handheld Computing Device" dated Aug. 6, 1996.

Self-capacitance may be measured through the detection of the amount of charge accumulated on an object held at a given voltage (Q=CV). Self-capacitance is typically measured by applying a known voltage to an electrode, and then using a circuit to measure how much charge flows to that same electrode. When external objects are brought close to the electrode, additional charge is attracted to the electrode. As a result, the self-capacitance of the electrode increases. Many touch sensors are configured such that the grounded object is a finger. The human body is essentially a capacitor to a surface where the electrical field vanishes, and typically has a capacitance of around 100 pF.

Electrodes in self-capacitance touchscreens and/or touchpads are typically arranged in rows and columns. By scanning first rows and then columns the locations of individual disturbances induced by the presence of a finger, for example, can be determined.

The second primary capacitive sensing and measurement technology employed in capacitive touch sensing devices is that of mutual capacitance, where measurements are typically performed using a crossed grid of electrodes. See, for example, U.S. Pat. No. 5,861,875 to Gerpheide entitled "Methods and Apparatus for Data Input" dated Jan. 19, 1999. In mutual capacitance measurement, capacitance is measured between two conductors, as opposed to a self-capacitance measurement in which the capacitance of a single conductor is measured, and which may be affected by other objects in proximity thereto.

In some mutual capacitance measurement systems, an array of sense electrodes is disposed on a first side of a substrate and an array of drive electrodes is disposed on a second side of the substrate that opposes the first side, a column or row of electrodes in the drive electrode array is driven to a particular voltage, the mutual capacitance to a single row (or column) of the sense electrode array is measured, and the capacitance at a single row-column intersection is determined. By scanning all the rows and columns a map of capacitance measurements may be created for all the nodes in the grid. When a user's finger or other electrically conductive object approaches a given grid point, some of the electric field lines emanating from or near the grid point are deflected, thereby decreasing the mutual capacitance of the two electrodes at the grid point. Because each measurement probes only a single grid intersection point, no measurement ambiguities arise with multiple touches as in the case of some self-capacitance systems. Moreover, it is possible to measure a grid of n×n intersections with only 2n pins on an IC.

Several problems are know to exist in respect of the operation of prior art mutual capacitance touchscreens, however, including, but not limited to, distinguishing real finger touches from hovering finger touches, an inability to predict with any certainty where a user is likely to place his finger on a touchscreen next, noise signals interfering with touch signals, significant variability among different users with respect to their touch habits and motions, undesired changes in operational characteristics arising from changes in the ambient environment or changing finger sizes or user habits, and high power consumption that may be induced by false wakeups.

Improved methods of operating a mutual capacitance sensing system are required to permit more accurate and adaptable touch sensing, as well as reduced power consumption.

SUMMARY OF THE INVENTION

In one embodiment, there is provided a method of sorting motion reports in a processor of a mutual capacitance sensing device comprising tracking individual touch points of a user on a touch panel or touchpad of the sensing device, reporting a plurality of individual touch points to registers of the sensing device, sorting, in the processor, the plurality of individual touch points according to touch identification ("Touch ID") or to touch force ("Touch Force"), if Touch ID is employed to sort touch points, mapping a first touch point having a smallest Touch ID associated therewith to a first register location and mapping a second touch point having a largest Touch ID associated therewith to a last register location, and if Touch Force is employed to sort touch points, mapping the first touch point having a highest force associated therewith to the first register location, and mapping the second touch point having a lowest force associated therewith to the last register location.

In another embodiment, there is provided a method of reporting touch points in a mutual capacitance sensing device comprising tracking individual touch points of a user on a touch panel or touchpad of the sensing device, reporting a plurality of individual touch points to registers of a processor, determining, in the processor, whether a particular touch point from among the reported plurality of individual touch points is a new touch point or an existing touch point, if the touch point is determined to be a new touch point, determining in the processor whether a touch force value associated with the new touch point is greater than a first threshold and then identifying the new touch point in the processor as a touch, and if the touch force value is less than the first threshold then identifying the touch point in the processor as a hover, if the touch point was previously detected as a hover, determining in the processor whether the touch force value associated with the touch point is greater than the first threshold and then identifying the touch point in the processor as a touch, and if the touch force value is less than the first threshold then identifying the touch point in the processor as a hover, if the touch point was previously detected as a touch, determining in the processor whether the touch force value associated with the touch point is greater than a second threshold and then identifying the touch point in the processor as a touch, and if the touch force value is less than the second threshold then identifying the touch point in the processor as a hover, and repeating steps (a) through (f) in the registers and processor until all the reported individual touch points have been identified as touches or hovers.

In yet another embodiment, there is provided a method of improving noise robustness and navigation performance in a mutual capacitance sensing device comprising determining, in a processor, whether noise levels in touch point data acquired from a touch panel or touchscreen forming a portion of the sensing device exceed a noise threshold, and if the noise levels exceed the threshold, increasing the rate at which touch point data are acquired for a predetermined period of time.

In still another embodiment, there is provided a method of improving noise robustness and navigation performance in a mutual capacitance sensing device comprising determining, in a processor, whether noise levels in touch point data acquired from a touch panel or touchscreen forming a portion of the sensing device exceed a noise threshold, and if the noise levels exceed the threshold, increasing the number of touch point values employed to calculate an average touch value for a given x, y position on a touch panel of the sensing device.

In a further embodiment, there is provided a method of improving noise robustness and navigation performance in a mutual capacitance sensing device comprising determining, in a processor, whether noise levels in touch point data acquired from a touch panel or touchscreen forming a portion of the sensing device exceed a noise threshold, and if the noise levels exceed the threshold, decreasing the rate at which darkframe reference values associated with the sensing device are adapted.

In a still further embodiment, there is provided a method of improving noise robustness and navigation performance in a mutual capacitance sensing device comprising determining, in a processor, whether noise levels in touch point data acquired from a touch panel or touchscreen forming a portion of the sensing device exceed a noise threshold, and if the noise levels exceed the threshold, prolonging for a predetermined period of time the duration over which a touch point remains indicated as a current touch point.

In another embodiment, there is provided a method of determining a touch area of a user's finger on a touch panel or touchpad in a mutual capacitance sensing device comprising determining, in a processor of the sensing device, which center sense cell in the touch panel or touchpad is generating a highest touch point signal level and determining such highest touch point signal level, determining touch point signal levels corresponding to cells adjacent to the center cell, for those adjacent cells where signal levels corresponding thereto meet or exceed a predetermined percentage of the highest touch point signal level, designating such cells as touch cells together with the center cell, and determining a touch area of the touch panel or touchpad on the basis of the touch cells.

In yet a still further embodiment, there is provided a method of avoiding false wakeups and minimizing power consumption in a mutual capacitance sensing device having a touch panel or touchpad comprising operating the sensing device in a rest mode having a first power consumption mode associated therewith where a processor periodically searches for touches on the touch panel or touchscreen at a first predetermined rate, and in an absence of detecting a touch on the touch panel or touchpad over a first predetermined period of time, shifting the sensing device using the processor to a second power consumption mode that is lower than the first power consumption mode where the processor periodically searches for touches on the touch panel or touchscreen at a second predetermined rate that is lower than the first predetermined rate.

Further embodiments are disclosed herein or will become apparent to those skilled in the art after having read and understood the specification and drawings hereof.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

Different aspects of the various embodiments of the invention will become apparent from the following specification, drawings and claims in which:

The drawings are not necessarily to scale. Like numbers refer to like parts or steps throughout the drawings.

DETAILED DESCRIPTION

Figure 1:
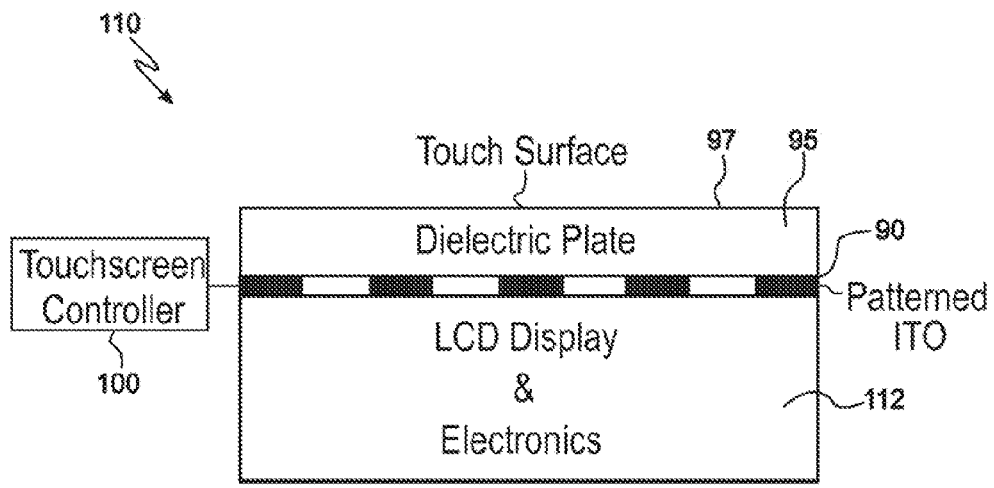
FIG. 1 shows a cross-sectional view of one embodiment of a capacitive touchscreen system.

As illustrated in FIG. 1, in one embodiment mutual capacitance touch sensing system 110 is a capacitive touchscreen system comprising an underlying LCD or OLED display 112, an overlying touch-sensitive panel or touchscreen 90, a protective cover or dielectric plate 95 disposed over the touchscreen 90, and a touchscreen processor, controller, microprocessor, application specific integrated circuit ("ASIC"), CPU or other suitable processing and computing device 100. Note that system 110 be configured as a capacitive touchscreen system or as a capacitive touchpad system.

Figure 2:
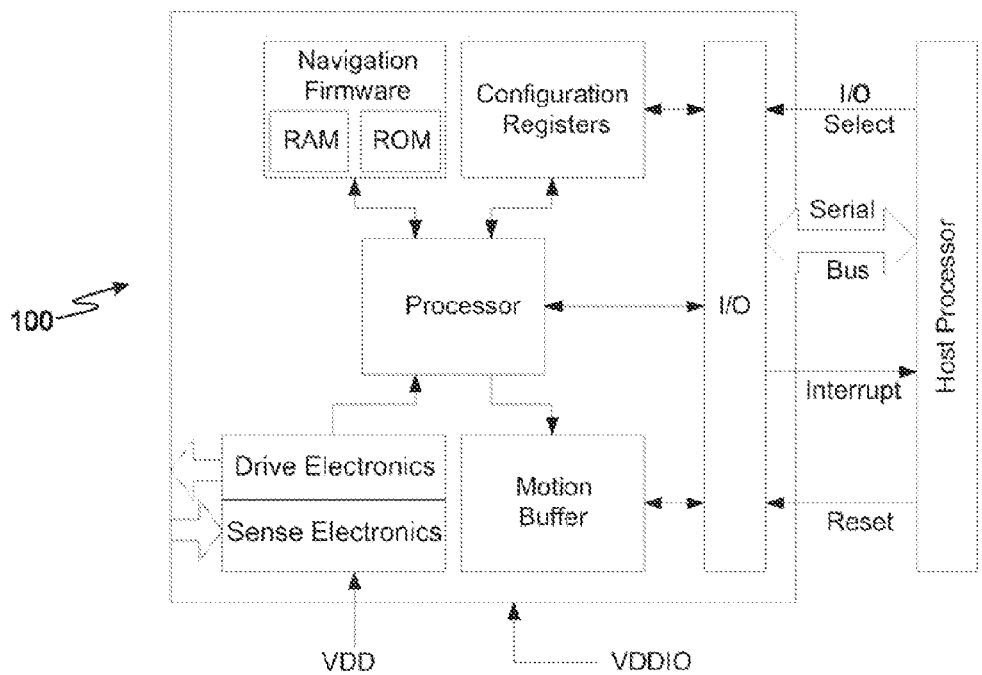
FIG. 2 shows a block diagram of a touchscreen controller.

FIG. 2 shows one embodiment of a block diagram of an Avago Technologies™ AMRI-5000 ASIC or chip 100, which is a low-power capacitive touch-panel controller designed to provide a touchscreen system with high-accuracy, on-screen navigation. Capacitive touchscreens 90 can be formed by applying a conductive material such as Indium Tin Oxide (ITO) to the surface(s) of a dielectric plate, which typically comprises glass, plastic or another suitable electrically insulative and preferably optically transmissive material, and which is usually configured in the shape of an electrode grid. The capacitance of the grid holds an electrical charge, and touching the panel with a finger presents a circuit path to the user's body, which creates a disruption. In the embodiment illustrated in FIG. 2, a touchscreen controller 100 senses and analyzes the coordinates of these disruptions. When the touchscreen 90 is affixed to a display with a graphical user interface, on-screen navigation is possible by tracking the touch coordinates. Often it is necessary to detect multiple touches. The size of the grid is driven by the desired resolution of the touches. Typically there is an additional cover plate 95 to protect the top ITO layer of touchscreen 90 to form a complete touch screen solution (see, e.g., FIG. 1).

One way to fabricate touchscreen 90 is to apply an ITO grid on one side only of a dielectric plate or substrate. When touchscreen 90 is mated with a display there is no need for an additional protective cover. This has the benefit of creating a thinner display system with improved transmissivity (>90%), enabling brighter and lighter handheld devices. Applications for the AMRI-5000 chip include, but are not limited to, smart phones, portable media players, mobile internet devices (MIDs), and GPS devices.

Figure 3:
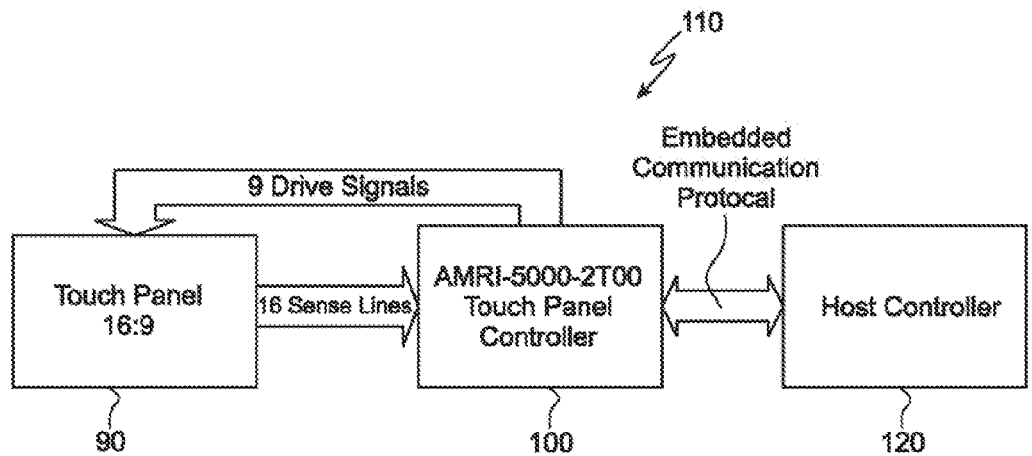
FIG. 3 shows one embodiment of a block diagram of a touchscreen system and a host controller.
Figure 4:
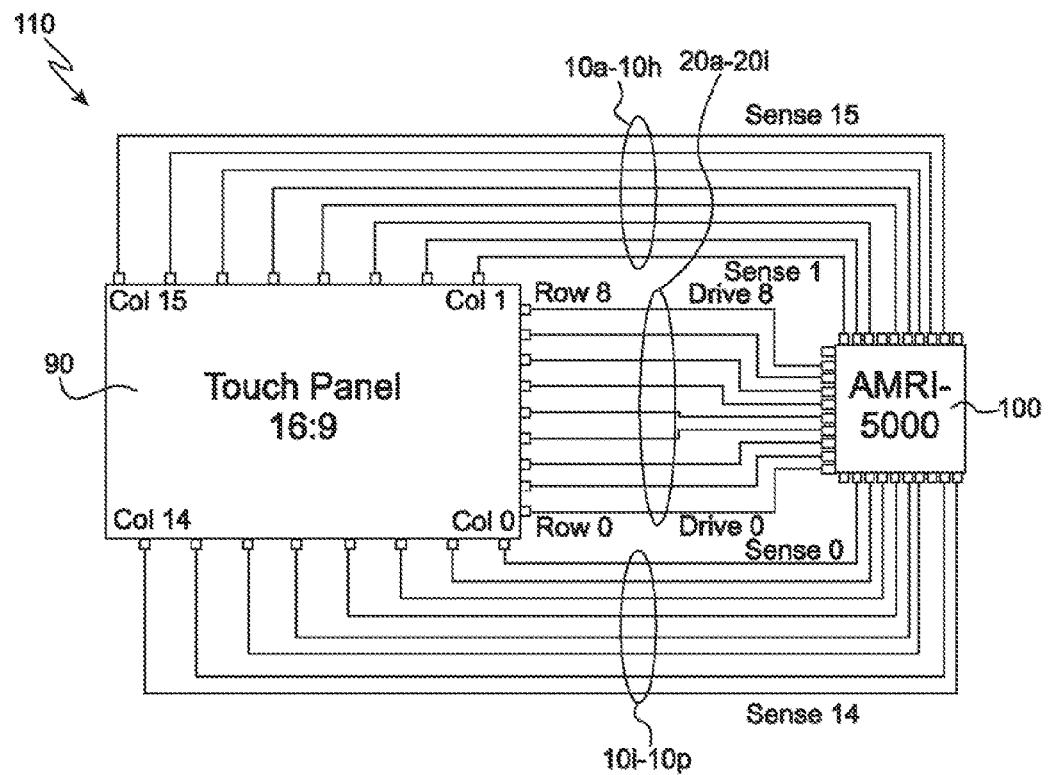
FIG. 4 shows a schematic block diagram of one embodiment of a touchscreen system.

Referring now to FIGS. 3 and 4, in one embodiment processor or controller 100 is an AMRI-5000 touchscreen controller that includes an analog front-end with 9 drive signal lines and 16 sense lines connected to an ITO grid on a touchscreen. Processor or controller 100 applies an excitation square wave to the drive electrodes that may have a frequency selected from a range between about 40 kHz and about 200 kHz. The AC signal is coupled to the sense lines via mutual capacitance. Touching panel 90 with a finger alters the capacitance at the location of the touch. AMRI-5000 controller 100 in FIGS. 3 and 4 can resolve and track multiple touches simultaneously. A high refresh rate allows the host to track rapid touches and any additional movements without appreciable delay. The embedded processor filters the data, identifies the touch coordinates and reports them to the host. The embedded firmware can be updated via patch loading.

Those skilled in the art will understand that touchscreen or touchpad processors, controllers, micro-processors, ASICs, CPUs or other suitable computing or processing devices other than an AMRI-5000 chip may be employed in mutual capacitance touch sensing system 110, and that different numbers of drive and sense lines, and different numbers and configurations of drive and sense electrodes, other than those explicitly shown herein may be employed without departing from the scope or spirit of the various embodiments of the invention.

Further according to one embodiment, capacitive touchscreen 90 is formed by applying a conductive material such as Indium Tin Oxide (ITO) to the surface(s) of dielectric plate or substrate 92, which typically comprises glass, plastic or other suitable dielectric or electrically insulative and preferably optically transmissive material, and which is usually configured in the shape of an electrode grid. The capacitance of the grid holds an electrical charge, and touching the panel with a finger presents a circuit path to the user's body, which creates a disruption. Processor or controller 100 senses and analyzes the coordinates of these disruptions. When the touchscreen 90 is affixed to a display with a graphical user interface, on-screen navigation is possible by tracking the touch coordinates. The size of the grid is driven by the desired resolution of the touches. Typically there is an additional cover plate disposed over touchscreen 90 to protect the top layer of ITO disposed thereon. In another embodiment, the ITO is laid down on the underside of substrate 92, thereby obviating the need for a separate cover plate.

In some embodiments of touchscreen 90, a first layer of ITO comprising a first set of electrodes is laid down on substantially optically transparent or transmissive substrate 92 formed of, for example, glass or plastic, where the thickness of the ITO on such substrate is about 1 micron. Next, an electrically insulative layer comprising a substantially optically transparent or transmissive material such as a suitable polymer is laid over the first set of electrodes and has a thickness of about 2 microns. Then a second layer of ITO comprising a second set of electrodes is laid down atop the electrically insulative layer and is also about 1 micron thick, thereby forming a "single-layer" sensor array, where the sensor array is disposed on a single side of the substrate. The substrate is typically about 0.5 mm in thickness. In another embodiment, first and second layers of ITO are laid down on a single side of a substrate in the same plane, and cross-overs are employed to bridge between portions of the electrodes as required. See, for example, U.S. patent application Ser. No. 12/024,057 filed Jan. 31, 2008 to Harley et al. entitled "Single Layer Mutual Capacitance Sensing Systems, Devices, Components and Methods", the entirety of which is incorporated by reference herein, where examples of such crossovers and single-layer electrode configurations are disclosed, at least some of which may be employed in conjunction with the various embodiments described or shown herein. In still another embodiment, first and second layers of ITO are laid down on opposing sides of an electrically insulative substrate.

Referring still to FIGS. 3 and 4, according to one embodiment timing control in mutual capacitance touch sensing system 110 is provided with a "heartbeat" (or line scan) timing method. Processor or controller 100 generates a heartbeat or line scan at regular intervals. Every time a heartbeat or line scan occurs, processor or controller 100 is triggered to acquire a new line of touch panel data. When data acquisition has been completed, a firmware interrupt is generated to trigger the firmware to process the newly acquired data. Once all lines of a frame (a complete panel scan) have been acquired, the firmware branches to the navigation code to interpret the data and report any touches to the host system. Mutual capacitance touch sensing system 110 preferably includes the ability to reduce the heartbeat or line scan rate in order to save power when there are no touches that are being detected on touch panel 90. In such a mode a long heartbeat or line scan is added after each frame is acquired.

In respect of data acquisition, for each heartbeat or line scan processor or controller 100 applies a square wave drive signal a selected one of the drive lines, and reads the capacitance values for each of sense lines 1-16 corresponding to the cells in the current row. In one embodiment, the firmware of mutual capacitance touch sensing system 110 comprises a base system which resides in on-chip ROM, plus "patch"

code that is loaded into on-chip RAM by the host after power up. This gives mutual capacitance touch sensing system 110 the ability to update firmware after the processor or controller 100 has been manufactured.

Patch code is loaded by putting processor or controller 100 into "patch download" mode and then writing each byte of patch code in succession to the patch download register. The ROM code is responsible for decoding the bytes and writing the code into the RAM space. Once loading has been completed and the CRC has been verified, the ROM code updates the jump table to enable the new patch code. A firmware reset is then performed to start executing the newly loaded code.

With respect to control registers, in one embodiment processor or controller 100 incorporates up to 128 registers that control system behavior and that may be configured to report data to a host controller. These registers may be accessed by the host controller via TWI or SPI interfaces, and may include functionality such as adjusting analog gain, controlling various filters, setting the number of active drive and sense lines on the panel, setting the virtual height and width of the panel (which determines the coordinates returned to the host controller), and selecting which events cause host interrupts.

With respect to navigation, the firmware is responsible for interpreting the panel data to determine if a finger touch has occurred, and if so, what the coordinates of the touch are. To do this, the firmware maintains a set of touch thresholds that are dynamically adjusted based on the current touch level and certain parameters which can be adjusted by the host controller, which it is to be noted is separate and apart from processor or controller 100 (see, for example, processor or controller 100 in FIG. 2, and processor or controller 100 and host processor or controller 120 in FIG. 3). Host controller 120 is typically provided as a part of the overall device into which touchscreen or touchpad system 110 is incorporated, such as a mobile telephone, laptop computer or MP3 player.

According to one embodiment illustrated in FIG. 4, an ITO grid on touchscreen 90 comprises drive rows 20*a*-20*i* and sense columns 10*a*-10*p*, where rows 20 are connected to drive signal lines and columns 10 are connected to sense lines. One configuration for routing ITO drive and sense lines to an AMRI-5000 chip is shown in FIG. 4.

Figure 5:
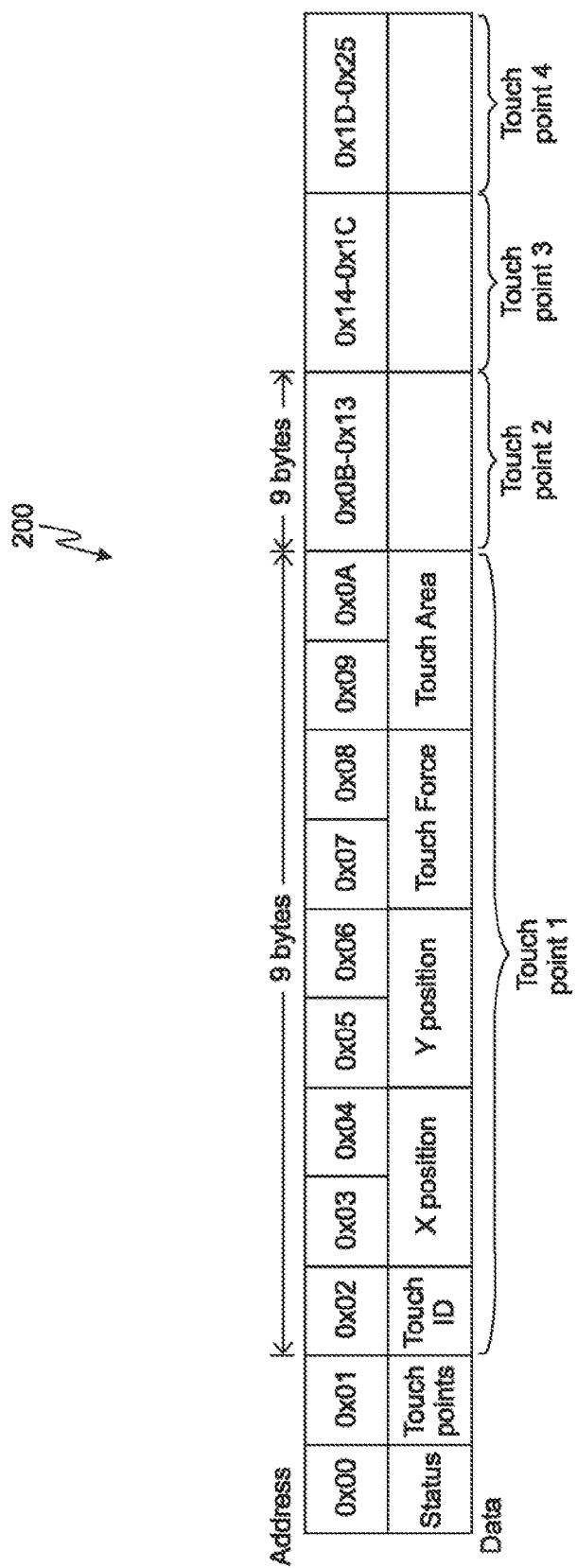
FIG. 5 shows one embodiment of touch report registers 200 of processor or controller 100.

Various embodiments of algorithms, methods and devices disclosed and described herein relate to motion report sorting that can be carried out by the AMRI-5000 IC described above, or indeed any suitable computing device. Motion report sorting allows a user to decide in what order a motion report should be returned to host controller 120. One advantage of such a motion report is that a customer or end user of the IC can prioritize the types of information presented to them in a motion report, thereby permitting fewer data bytes to be transmitted over an SPI/TWI interface. According to one embodiment, a motion report may be effected in the firmware and registers of an AMRI-5000 IC or other suitable processor or controller 100 as shown in FIG. 5, where it will be seen that according to one embodiment up to four touch points may be included in the motion report data stored in registers 0x00 through 0x25. In the embodiment shown in FIG. 5, the maximum size of the data that may be stored in such registers is 38 bytes. In some embodiments, the touch points are sorted according to touch identification ("Touch ID") or to touch force ("Touch Force"). If Touch ID is employed to sort touch points, the touch point with the smallest ID is mapped to the first register location. If Touch Force is employed to sort touch points, the touch point with the highest force is mapped to the first touch point location in the register, and the touch point with the lowest force is mapped to the last touch point location in the register.

Continuing to refer to the embodiment shown in FIG. 5, register 0x01 indicates how many touch points have been detected. Consequently, the host controller may optionally calculate how many groups of 9 bytes of data (i.e., touch point data packets) can be read from the registers, starting with register address 0x02. For example, if there are only two touch points stored in the motion report registers, then the host controller need only read the next 18 bytes.

Still referring to the embodiment shown in FIG. 5, touch point data packets may be organized in the format shown therein, where Byte 1 is used to provide an indication of a real or a hovering touch point, and where Bit[6:0] represents Touch ID, with a range between 5 and 126, and Bit [7] represents the touch point state, with 1 being a real touch point and 0 being a hovering touch point; Bytes 2-3 are used to provide an indication of interpolated X positions of touch points (using unsigned 16-bit data); Bytes 4-5 are used to provide an indication of interpolated Y positions of touch points (using unsigned 16-bit data); Bytes 6-7 are used to provide an indication of touch point Z-force values (using unsigned 16-bit data); and Bytes 8-9 are used to provide an indication of touch point area values (using unsigned 16-bit data).

Figure 6:
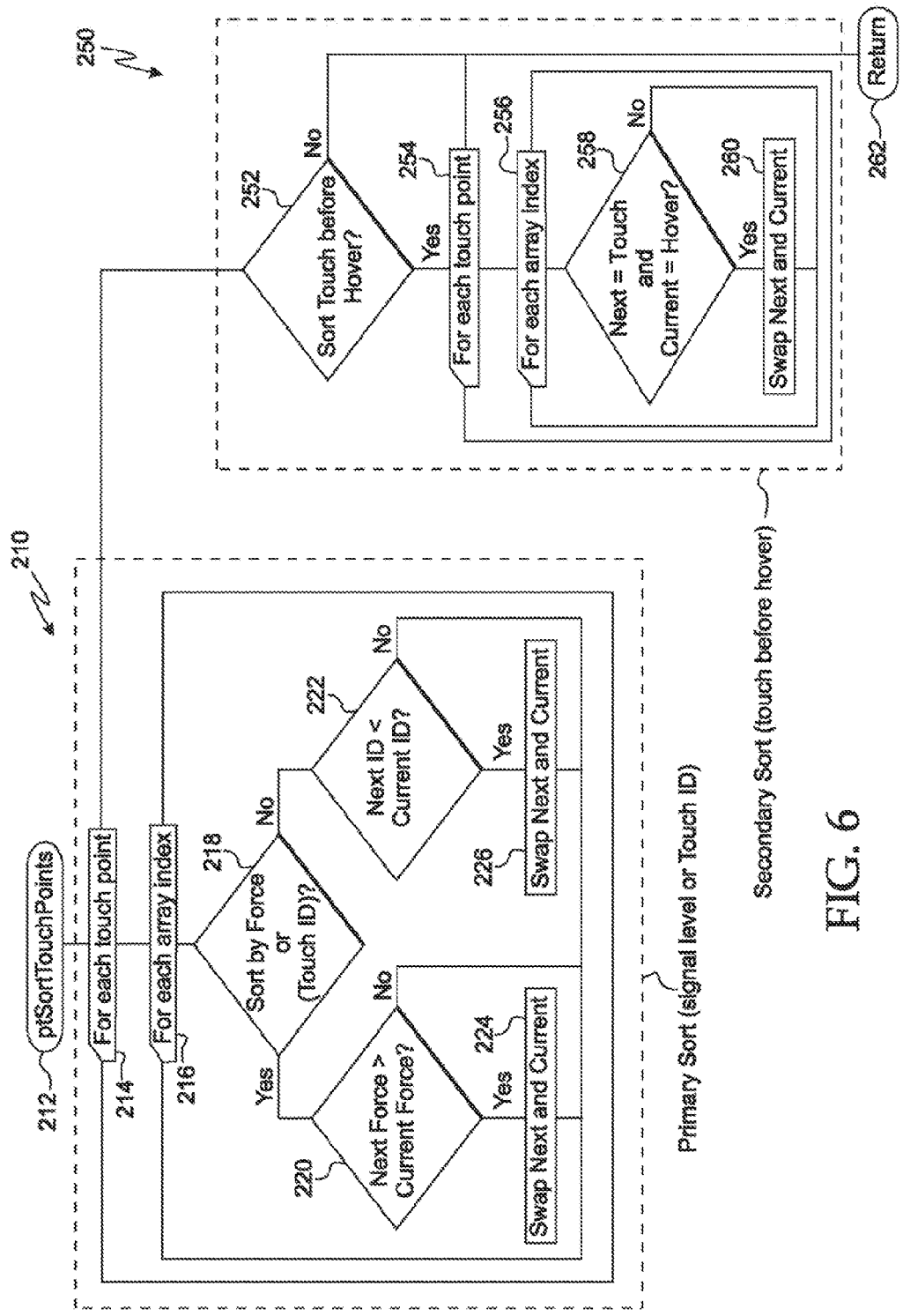
FIG. 6 shows embodiments of sorting algorithms 210 and 250.

Referring now to FIG. 6, there are shown primary sorting algorithm 210 (with steps 212 through 226) and secondary sorting algorithm 250 (with steps 252 through 262), which are configured to carry out one embodiment of the motion report sorting algorithm and method described above in connection with FIG. 5. Those skilled in the art will understand that embodiments other than those shown explicitly in FIGS. 5 and 6 are also contemplated and fall within the scope of the invention. As shown in FIG. 6, the firmware starts by looping through the current set of touch points and checks whether touch point sorting is to be done according to Touch Force or Touch ID.

Referring first to primary sort algorithm 210 of FIG. 6, if sorting by Touch Force has been pre-selected by a user or the manufacturer of the IC into which the firmware has been loaded, the next touch point force value is compared to the current touch point force value. If the next touch point force value is greater than the current touch point force value, the two data packets are swapped. Otherwise, the two packets are left in their original positions. If sorting by Touch ID has been pre-selected by a user or the manufacturer of the IC into which the firmware has been loaded, the next touch point ID value is compared to the current touch point ID value. If the next touch point ID value is less than the current touch point ID value, the two data packets are swapped. Otherwise, the two packets are left in their original positions.

Referring now to secondary sort algorithm 250 of FIG. 6, and providing the secondary sort algorithm has been enabled by the firmware loaded in processor or controller 100, the firmware sorts touch points before hover points. The firmware starts by looping through the current set of touch point values and checks the next touch point ID value against the current touch point ID value. If the next touch point ID value is set (i.e., a touch has been detected) and the current touch point ID value has not been set (i.e., a hover has been detected), the two data packets are swapped. Otherwise the two data packets are left in their original positions.

Figure 7:
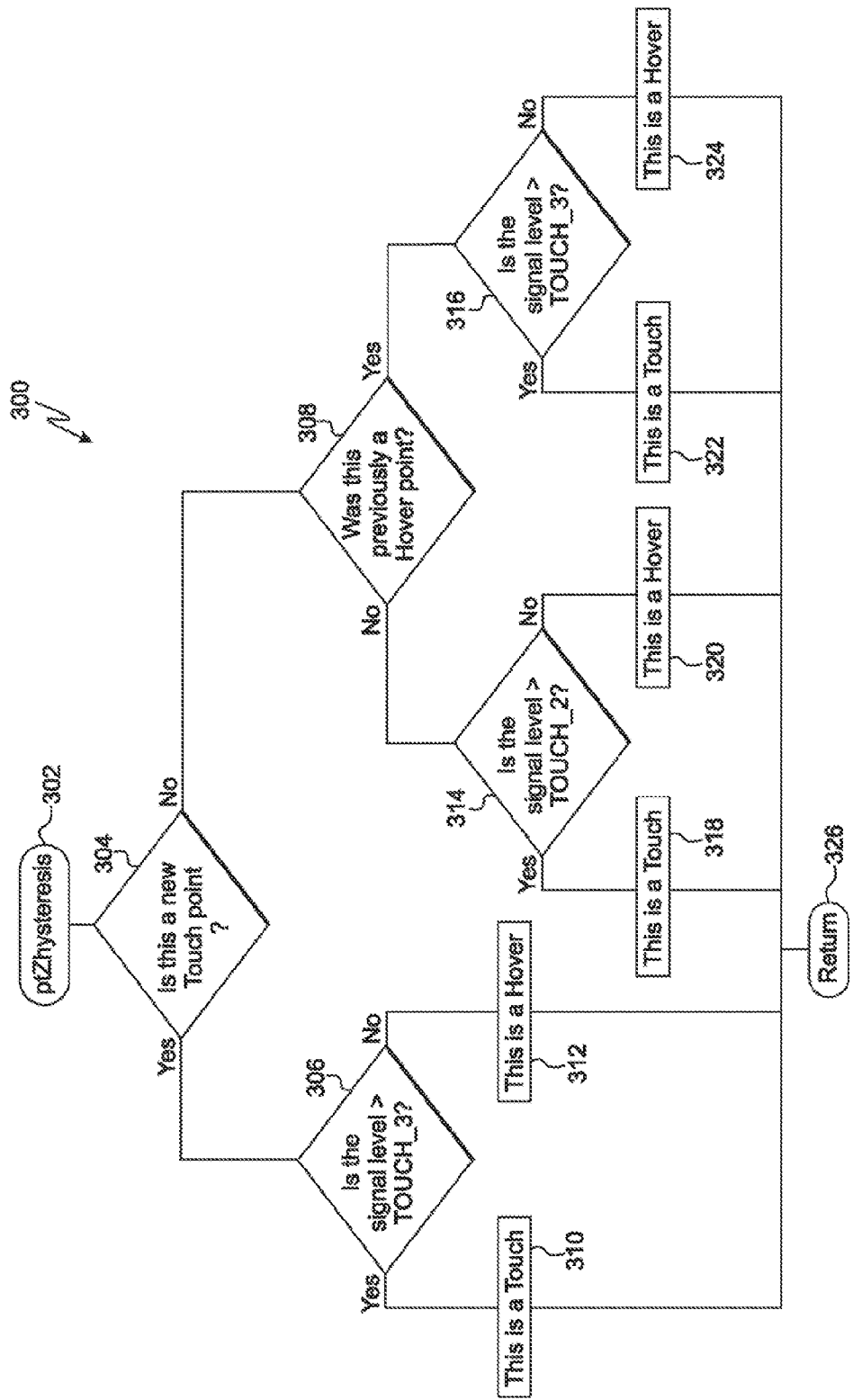
FIG. 7 shows one embodiment of per touch point hover reporting algorithm 300.

Various embodiments of algorithms, methods and devices disclosed and described herein relate to per touch point hover reporting that can be carried out by the AMRI-5000 IC described above, or indeed any suitable processing and computing device as described above (see FIG. 7). Those skilled in the art will understand that embodiments of algorithms other than that shown explicitly in FIG. 7 are also contemplated and fall within the scope of the invention. Per touch point hover reporting keeps track of individual touch points and reports the information to the host controller. This information can be used by the customer to aid in the implementation of touch gestures such as a "swipe" (the action of swiping a finger across a touch panel) or a "fling" (the action of flinging a finger across a touch panel, or swiping a finger across a touch panel with momentum). A "fling' may be characterized as consecutive motion reports where a finger is detected as a touch point followed by the touch point being detected as turning into a hover as the finger begins to lift off touch panel 90.

Referring still to FIG. 7, algorithm or method 300, and steps 302 through 326 thereof, illustrate one embodiment of per touch point hover reporting where the firmware loops through current touch point values arid checks to see if a touch point is a new touch point value or an existing touch point value. If a touch point value is new, the touch force value associated with that touch point is checked to see if it is greater than a TOUCH_3 threshold. If the touch force value associated with such touch point is greater than the TOUCH_3 threshold, the touch point is identified and marked as a touch. If the touch force value associated with such touch point is less than the TOUCH_3 threshold, the touch point is identified and marked as a hover. If the touch point was previously detected as a hover, the value associated with such touch point is checked to see if it is greater than the TOUCH_3 threshold. If the value associated with such touch point is greater than the TOUCH_3 threshold, the touch point is identified and marked as a touch. If the value associated with such touch point is less than the TOUCH_3 threshold, the touch point is identified and marked as a hover. If the previously detected touch point was not a hover, but was in fact a touch, the value associated with such touch point is checked to see if it is greater than the TOUCH_2 threshold. If the value associated with such touch point is greater than the TOUCH_2 threshold, the touch point is identified and marked as a touch. If the value associated with such touch point is less than the TOUCH_2 threshold, the touch point is identified and marked as a hover. This process continues until all the current touch points have been processed.

Figure 8:
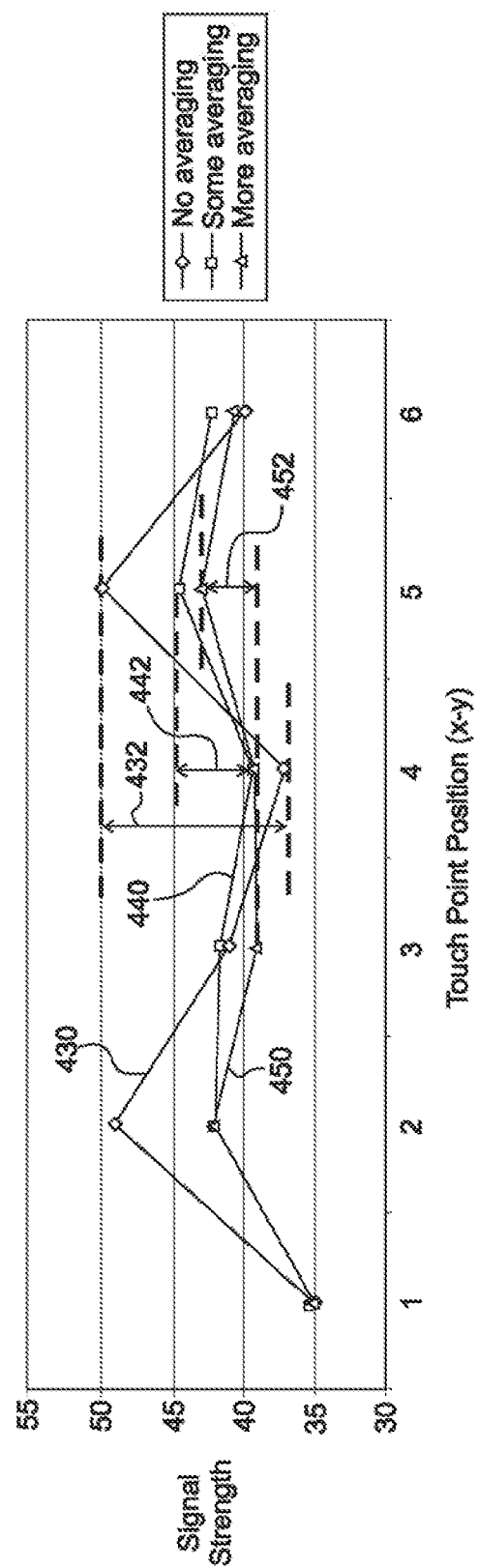
FIG. 8 shows comparative touch point data with no, some and more averaging of the data.
Figure 9:
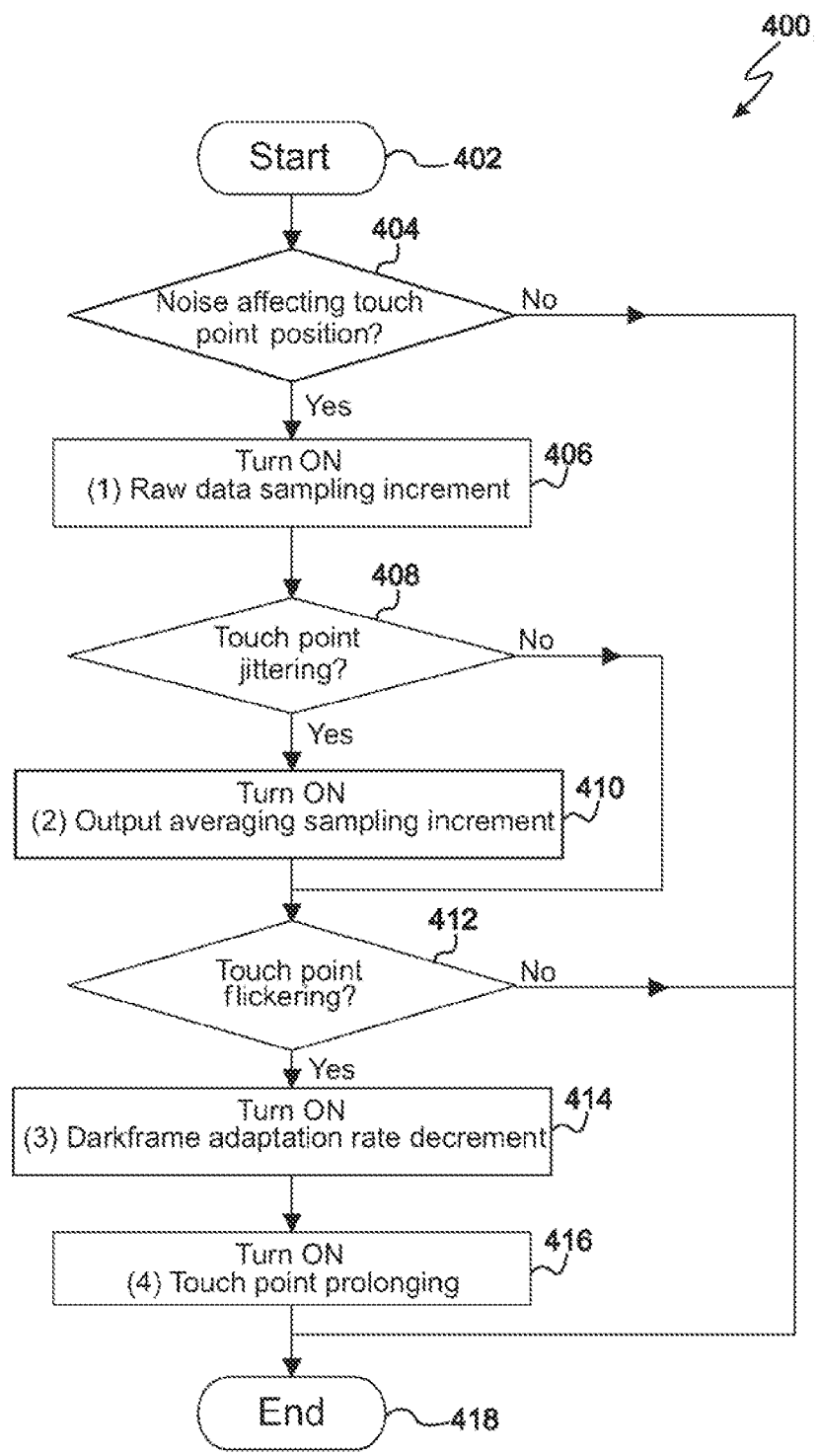
FIG. 9 shows one embodiment of algorithm 400 for improving noise robustness.

Referring now to FIGS. 8 and 9, there are illustrated several aspects of an improved noise robustness operating mode that improves navigation performance in the presence of high-level noise. Various embodiments of algorithms, methods and devices disclosed and described herein relate to such a noise robustness operating mode that can be carried out by the AMRI-5000 IC described above, or indeed any suitable computing device. Those skilled in the art will understand that embodiments other than those shown explicitly in FIGS. 8 and 9 are also contemplated and fall within the scope of the invention.

Without a noise robustness operating mode, whenever high-level noise is present that originates in system electronics, as a result of poor finger coupling to panel 90, or for any other reason, navigation performance may deteriorate. Most notably, such high-level noise may cause the reporting position of a touch point to bounce up and down within a range of values (i.e., jittering occurs), or the touch point may momentarily disappear from motion reporting (i.e., flickering occurs).

According to one embodiment, an improved noise robustness operating mode comprises at least one of four different operations: (1) increasing the sample rate at which data are acquired; (2) increasing the number of touch points used to formulate an average touch point value; (3) decreasing dark-frame adaptation rates, and (4) prolonging touch points, more about which is said below. Note that any one, or any suitable combination, of the foregoing four operations may be employed to decrease the susceptibility of mutual capacitance touch sensing system 110 to noise.

To track or measure noise levels, according to one embodiment firmware loaded in processor or controller 100 or another processor or controller such as host controller 120 may be configured to monitor and/or analyze on a statistical basis the raw sensed signal levels provided by the touch panel or touchpad over a given period of time. By way of example, statistical methods such as determining the standard deviations or the average absolute deviations corresponding to such raw sensed signal levels may be employed to monitor and/or analyze noise levels according to methods well known to those skilled in the art. Such deviation values can then be used to quantify noise levels.

As between a real touch point and an apparent touch point caused by noise, firmware may be configured to distinguish between a real touch and an apparent or false touch on the basis of their respective measured noise characteristics. Noise fluctuations typically occur at much higher frequencies than those produced by a human finger. As a result, the firmware can measure the frequency at which jitters and flickers occur.

In respect of jitters, the firmware can be configured to count the number of times signal levels associated with a particular touch position vary with respect to a predetermined threshold. This threshold can be set to define an acceptable value for touch point value variation. If the threshold corresponding to a given touch point position is exceeded, the touch point will be deemed to be a jitter. In respect of flickering, a similar method may be employed. The firmware can be configured to determine the period of time between a touch point disappearing and re-appearing for a given touch point location. If the determined period of time exceeds a predetermined time threshold that is selected to be faster than the tapping of a finger on the touch panel or touchscreen, the touch is deemed to be flickering.

With respect to the first operation relating to an improved noise robustness operating mode (increasing the sample rate at which data are acquired), the number of data samples acquired during a predetermined period or amount of time is increased temporarily when signals are acquired during high-noise periods from panel 90. By increasing data sample rates, the magnitude or impact of noise on the acquired data can be reduced.

With respect to the second operation relating to an improved noise robustness operating mode (increasing the number of touch points used to formulate an average touch point value), the number of touch values employed to calculate an average touch value for a given x, y position or touch point on a touch panel 90 is increased. By increasing the number of touch samples or values employed to formulate an average touch point value, smoother transitions for changes in touch point x-y positions across the touch panel result, thus reducing touch point jitter.

Referring to FIG. 8 there are shown touch point data 430 acquired from a touch panel corresponding to no touch point averaging (no averaging), touch point data 440 acquired from a touch panel corresponding to some touch point averaging ("some averaging" corresponding to an average obtained with 2 touch point values), and touch point data 450 acquired from a touch panel corresponding to more touch point averaging ("more averaging" corresponding to an average obtained with 3 touch point values). The total displacement or jitter for each set of touch point averages is denoted in FIG. 8 with arrows 432 (no averaging), 442 (some averaging) and 452 (more averaging). As shown in FIG. 8, displacement or jitter is smallest when the highest number of samples is used to formulate an average for each touch point.

With respect to the third operation relating to an improved noise robustness operating mode (decreasing darkframe adaptation rates), during normal operation darkframe signals (which represent the signals or values generated by a mutual capacitance touch panel when no finger or touch is present) are adapted from time to time to ensure that darkframe reference values do not change in response to changes in the ambient environment, such as variations in humidity or temperature. In the presence of high noise levels, however, it has been discovered that such darkframe reference values can be modified erroneously and undesirably. To reduce such errors, according to one embodiment the rate at which darkframe reference values are adapted is slowed when high noise levels are detected. In one embodiment, and by way of example only, when noise levels are low or non-existent, the update rate for darkframe reference values is set to every 15 frames, and 7.25% of the current darkframe reference value is applied to the updated darkframe reference value. In the presence of high noise levels, the update rate for darkframe reference values is reduced to every 30 frames and only 0.2% of the current darkframe reference value is applied to the updated darkframe reference value.

With respect to the fourth operation relating to an improved noise robustness operating mode (prolonging touch points), in some cases the magnitude of noise signals can be as large as touch signals, and can obliterate or mask touch signals completely. In the presence of such large noise signals, touch points may not be detected for short periods of time. Under such conditions a user may see touch points appear and disappear, or flicker. To counter such flickering, in one embodiment touch points that have been detected remain indicated as being current touch points for a duration of time that includes an additional predetermined but relatively short period of time that allows the next touch point to be reliably detected in the presence of noise without flicker. For example, in the AMRI-5000 IC the default value for the predetermined period of time can be set to 5 frames (or 5×16.67 milliseconds=83.3 milliseconds), where a full scan of touch panel 90 is carried out during each frame. In one embodiment, such a predetermined period of time is host controlled through register settings. Prolonging touch points reduces the possibility of sending sequential touch and no-touch status indications to mutual capacitance touch sensing system 110, which might be interpreted by mutual capacitance touch sensing system 110, by way of example, as a click and unclick. Each of the first through fourth operations may preferably be selectively turned ON or OFF by a user in accordance with characteristics and severity of noise signals that are being detected by mutual capacitance touch sensing system 110.

Referring now to FIG. 9, there is shown one embodiment of algorithm 400 for increasing or improving the performance or navigation characteristics of a mutual capacitance touch sensing device in the presence of noise. Those skilled in the art will understand that embodiments other than that shown explicitly in FIG. 9 are also contemplated and fall within the scope of the invention. In algorithm 400 shown in FIG. 9, for example, one or more, or any combination of, the four noise mitigation operations described above may be implemented. Moreover, such operations may be carried out in singly, in combination, in parallel or sequentially according to any suitable order.

In one embodiment of algorithm 400, the decision of which noise mitigation or noise robustness improvement operation is to be invoked is determined in accordance with the flowchart shown in FIG. 9. First, at step 404 it is determined whether noise signals are affecting the determined positions of touch points. If the reported touch points of a finger that is not moving are deemed not to be jittery or flickering, then none of the noise robustness improvement operational modes need be invoked. If jitters or flickers are observed, then the sample rate at which data are acquired is increased at step 406 ((1) Raw data sampling increment). This operation attempts to reduce or eliminate the effects of noise signals on touch point signals. If after sample rates have been increased touch points continue to jitter or flicker, output signal averaging is invoked at step 410 ((2) Output averaging sampling increment) to further reduce jitters and flickers of touch points. The third and fourth noise robustness improvement operating modes at steps 414 and 416 relating to darkframe adaptation and prolonging touch points may also be invoked, either sequentially or in parallel with the first two noise robustness improvement operating modes described above. In many cases where touch points appear to be flickering, noise signal amplitudes and frequencies are high, which can potentially corrupt darkframe reference values. By reducing darkframe adaptation rates, the deleterious effects of such high amplitude or frequency noise signals (such as jittering) can be reduced, while prolonging touch point reporting can reduce flickering.

Figure 10A:
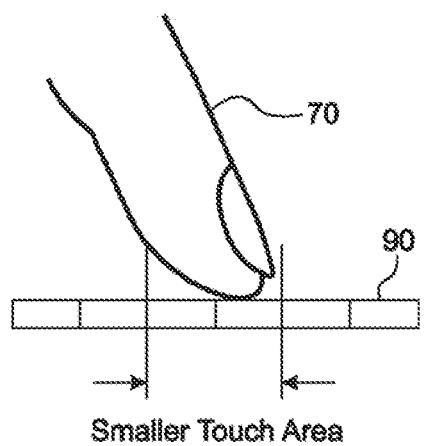
FIGS. 10(a) and 10(b) show side views of finger 70 applied to touchscreen 90 at different angles.
Figure 10B:
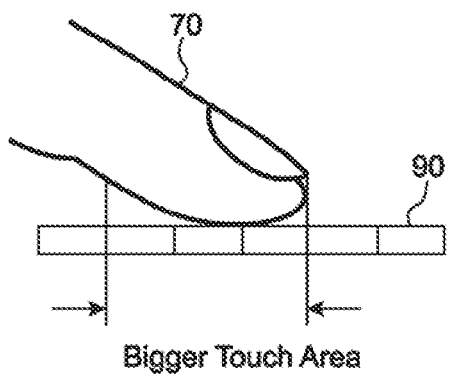

Referring now to FIGS. 10(*a*) through 15, there are illustrated several aspects of a touch area measurement algorithm, method and device for a mutual capacitance sensing device. Various embodiments of algorithms, methods and devices disclosed and described herein relate to such touch area measurement techniques that can be carried out by the AMRI-5000 IC described above, or indeed any other suitable computing device. Those skilled in the art will understand that embodiments other than those shown explicitly in FIGS. 10(*a*) through 15 are also contemplated and fall within the scope of the invention.

In one embodiment, "touch area" is the area covered by or near to a conductive object such as a human finger that is applied to or touches a touch panel. In another embodiment "touch area" is represented by touch signals having magnitudes meeting or exceeding predetermined signal threshold levels, where the touch signals correspond to a centermost sensing cell and one or more surrounding sensing cells, and are located directly beneath or near a finger.

Referring now to FIGS. 10(*a*) and 10(*b*), there are shown two side views of different touch areas corresponding to two different positions of finger 70. In FIG. 10(*a*), finger 70 is tilted at a relatively high angle in respect of touch panel 90, and in consequence has a touch area corresponding to two sensing cells disposed beneath touch panel 90. In FIG. 10(*b*), finger 70 is tilted at a relatively low angle in respect of touch panel 90, and inconsequence has a touch area corresponding to three sensing cells disposed beneath touch panel 90. The high-angle position of finger 70 in FIG. 10(*a*) generates lower-magnitude touch signals than the low-angle position of finger 70 in FIG. 10(*b*). Note that the strength of touch signals generated by a finger 70 can vary according to many different variables, such as the size or width of a finger disposed touch panel 90, the angle of finger 70 with respect to touch panel 90, the conductivity of finger 70 that is applied to touch panel 90, the amount of force that is applied by a user through finger 70 to touch panel 90 (and the consequent degree to which finger tissue is compressed and spreads out against touch panel 90), and other factors.

Figure 11:
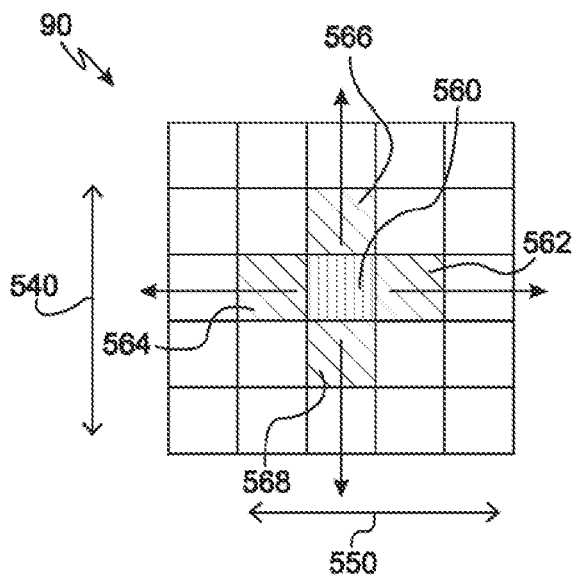
FIG. 11 shows one embodiment of a diagrammatical representation for calculating touch area.
Figure 12:
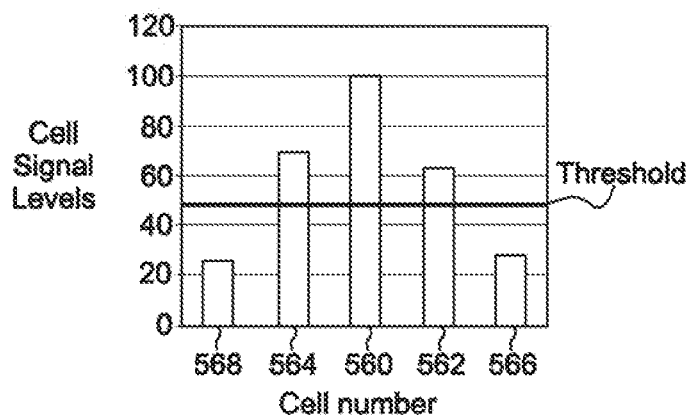
FIG. 12 shows comparative results obtained using the method illustrated by FIG. 11.

Referring now to FIGS. 11 and 12, in one embodiment the steps employed to calculate touch area are as follows. First, the signal levels corresponding to cells directly to either side of center cell 560 (which is the cell displaying the highest signal touch magnitude) in both horizontal and vertical directions 540 and 550, respectively, are analyzed. That is, the touch signal levels or magnitudes corresponding to cells 562, 564, 566 and 568 are evaluated. Next, if the signal magnitude of any of cells 562, 564, 566 and 568 meets or exceeds a certain percentage of the signal magnitude measured for center cell 560, such cell or cells are determined to be touch cells. For example, and referring to FIG. 12, of the four cells directly adjacent to center cell 560, only cells 562 and 564 have signal magnitudes exceeding a threshold calculated according to 50% of the signal magnitude measured at center cell 562.

After signal levels or magnitudes corresponding to center cell 560 and directly adjacent cells 562, 564, 566 and 568 have been evaluated and compared to one another, a first value proportional to the number and/or magnitude of sensed touches exceeding the threshold that have been measured along horizontal axis 550, and a second number proportional to the number and/or magnitude of sensed touches exceeding the threshold that have been measured along vertical axis 540, are generated. These two numbers may then be multiplied or added together, or otherwise scaled in respect of one another, to produce a number that is representative of a gross or approximate touch area. With additional filtering and averaging over time of the numbers that are generated to represent gross or approximate touch area, a smoother, more refined, more accurate and updated touch area value can be reported. The foregoing steps are represented by algorithm 500 shown in FIG. 13, and steps 502 through 518 thereof. Reporting calculated touch areas to the host controller or other processor permits gestures and other touch events that are unique or particular to a specific user to be developed, refined and stored over time.

Figure 13:
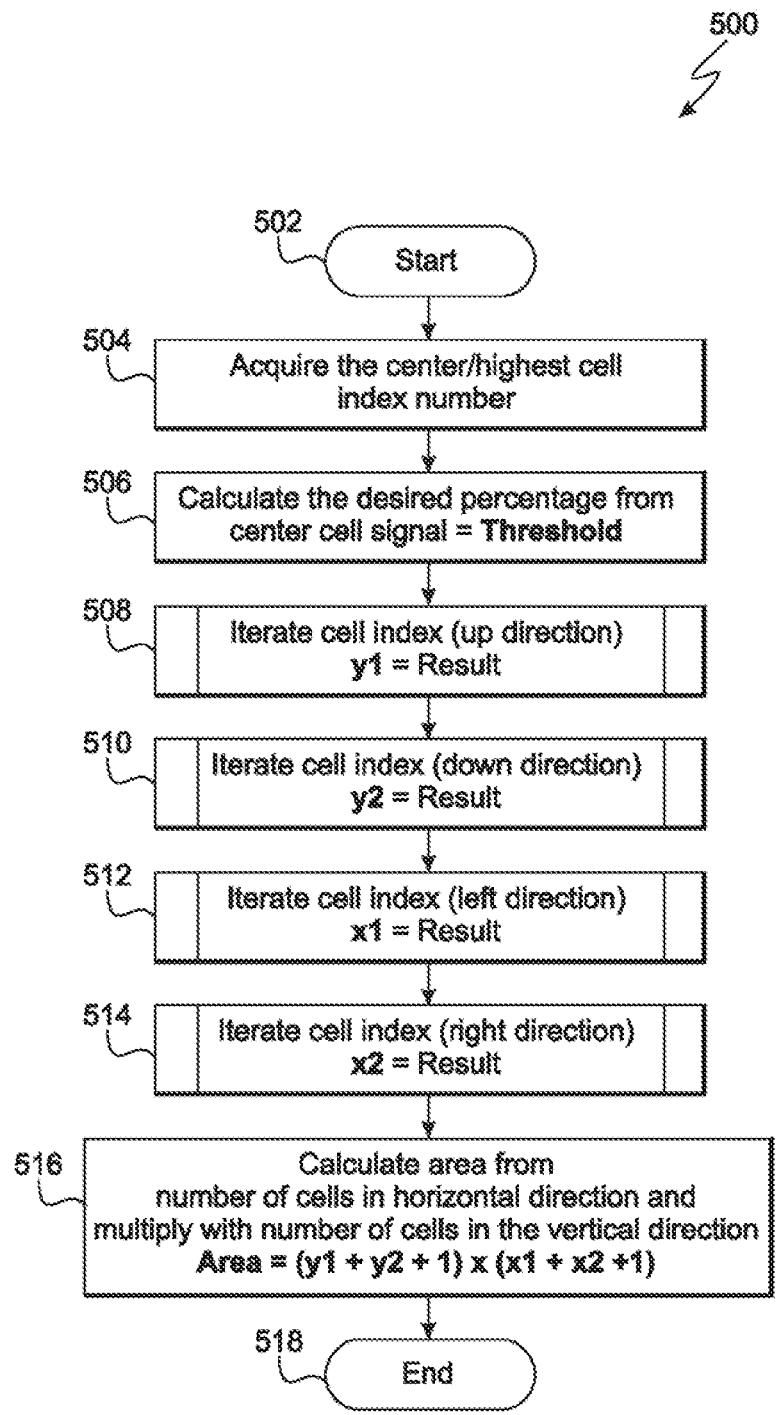
FIG. 13 shows one embodiment of algorithm 500 for calculating touch area.
Figure 14:
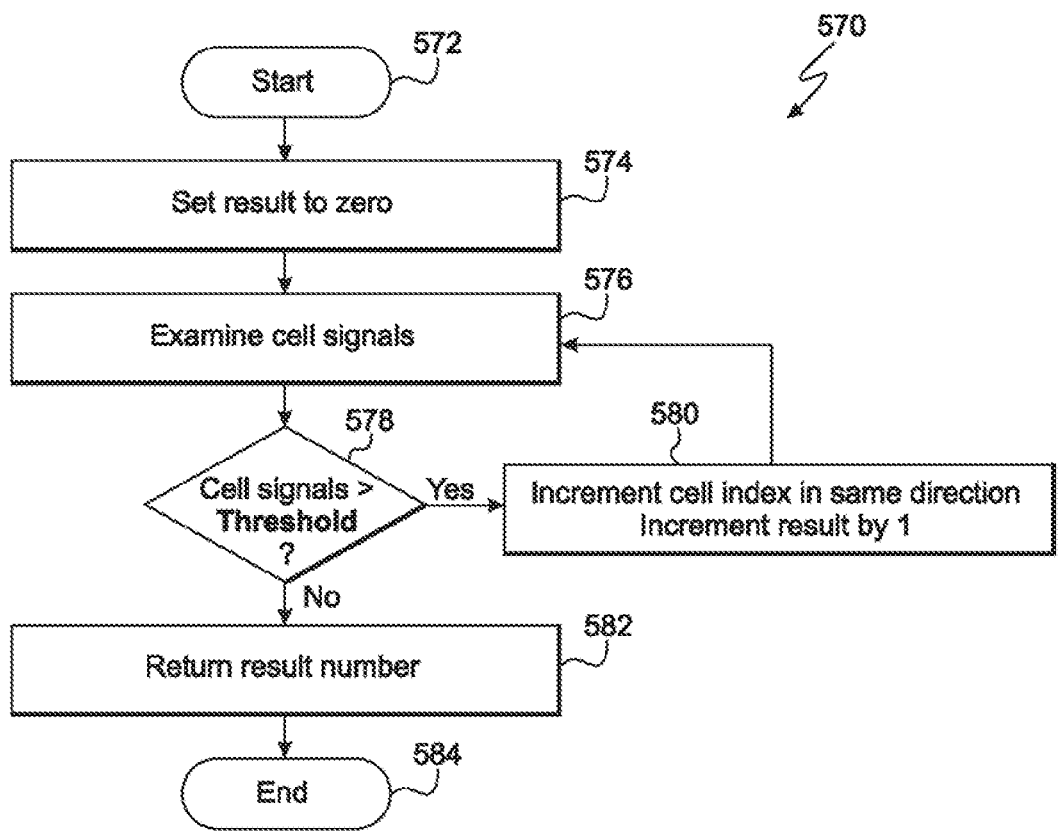
FIG. 14 shows another embodiment of algorithm 570 for calculating touch area.
Figure 15:
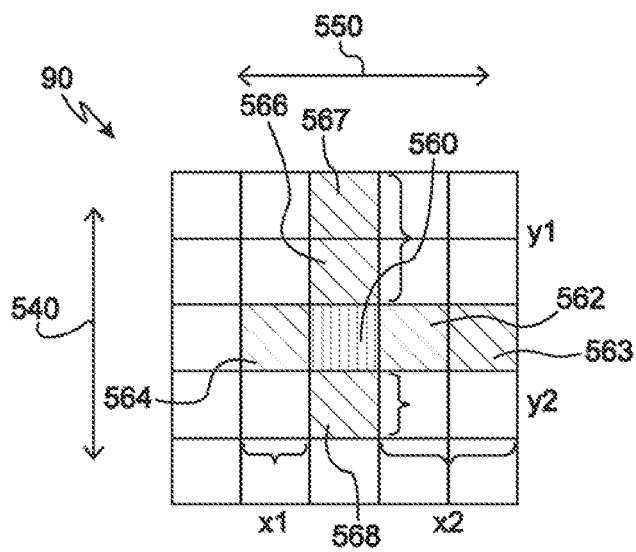
FIG. 15 shows another embodiment of a diagrammatical representation for calculating touch area.

Referring now to algorithm 500 of FIG. 13 and algorithm 570 of FIG. 14, as well as to the diagrams of touch panel 90 shown in FIGS. 11 and 15, the process of calculating touch area starts by identifying center touched cell 560, which is the cell having the highest touch signal level or magnitude. In one embodiment, the threshold is calculated using a predetermined percentage or coefficient applied to the signal level corresponding to center cell 560 as follows:

Threshold=Center cell magnitude×percentage     eq. (1)

In each of the four directions on touch panel 90, up, down, left and right, the measured touch signal level or magnitude of each cell is iteratively compared to the threshold. The iteration routine incorporated into algorithms 500 and 550 then yields the number of cells that have measured values meeting or exceeding the threshold value, such as a pair of numbers along vertical axis 540 (y1 and y2) and a pair of numbers along horizontal axis 550 (x1 and x2). According to one embodiment, the touch area is calculated using the following equation:

Touch Area=(y1+y2+1)×(x1+x2+1)     eq. (2)

A value of 1 is added along both axes to include values representing the center cell.

Referring now to FIG. 14, there is shown one embodiment of an algorithm 10 sub-process or sub-routine 570, which is associated with steps 508 through 514 of algorithm 500 in FIG. 13. In FIG. 14, at step 574 the result is set to zero if no cell signal is detected. Next, at step 576 the signal level associated with a cell adjacent to center cell 560 in a designated direction is determined. If the determined signal level exceeds a predetermined threshold calculated on the basis of the center cell's signal level, the result is incremented by 1. The sub-routine then increments the cell index at step 580 in the same designated direction and repeats the process of evaluating adjacent cell signal levels until all adjacent cell signal levels have been similarly evaluated, after which sub-routine 570 ceases operation and returns the result counts back to main algorithm 500.

Figure 16:
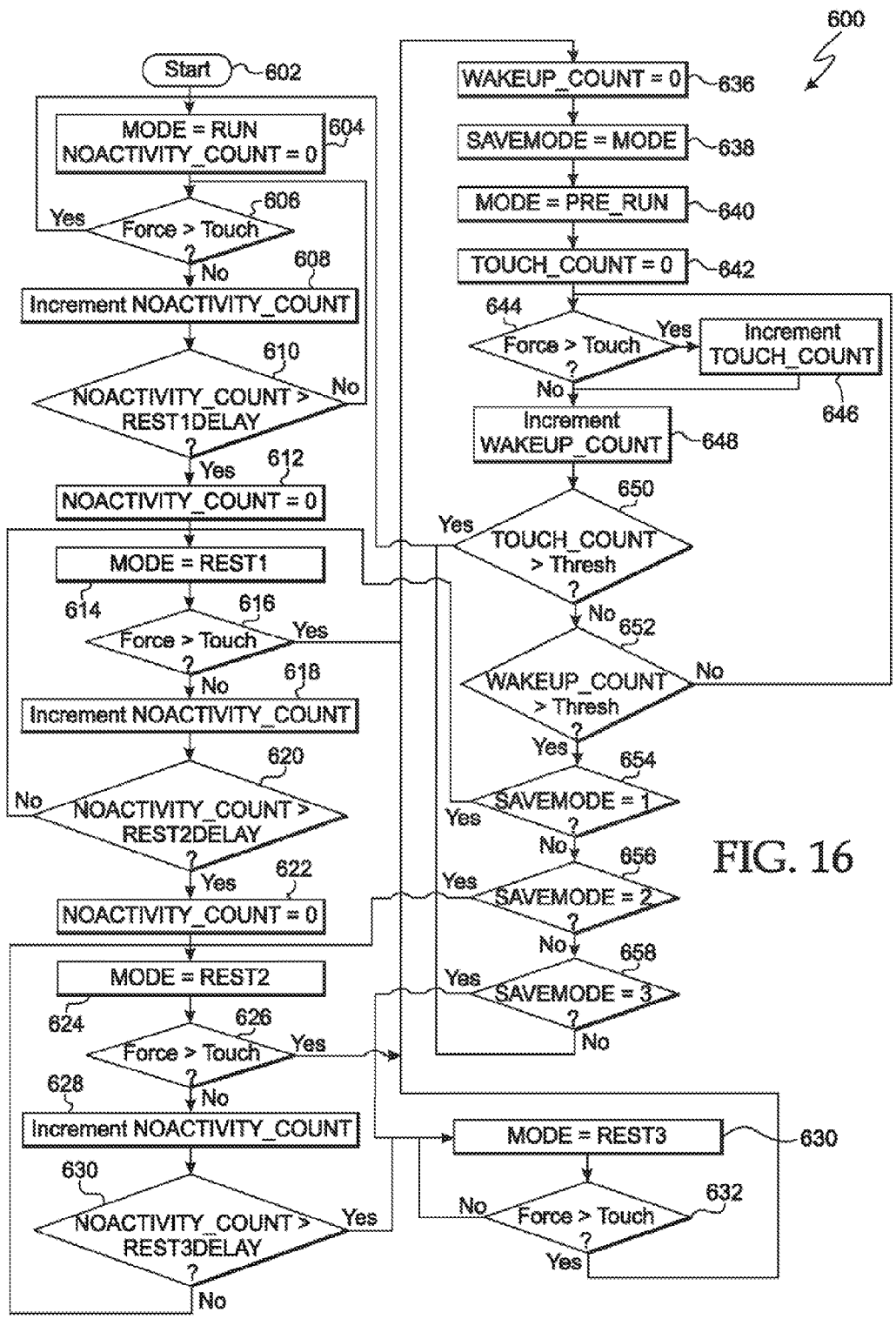
FIG. 16 shows one embodiment of algorithm 600 for avoiding false wakeups.

Referring now to FIG. 16, there are illustrated several aspects of a false wakeup avoidance algorithm, method and device for a mutual capacitance sensing device. Various embodiments of algorithms, methods and devices disclosed and described herein relate to such false wakeup avoidance techniques that can be carried out by the AMRI-5000 IC described above, or indeed any suitable computing device or processor.

Referring now to FIG. 16, algorithm 600 comprises various steps for carrying out a method of avoiding false wakeups. In one embodiment, an AMRI-5000 touchscreen controller 100 features multiple operating modes with varying levels of power consumption. Those skilled in the art will understand that embodiments other than that shown explicitly in FIG. 16 are also contemplated and fall within the scope of the invention. In rest mode processor or controller 100 periodically looks for touches at a rate programmed by the rest rate registers. There are multiple rest modes, each with successively lower power consumption. In the absence of a touch for a certain interval the processor or controller 100 automatically shifts to the next-lowest power consumption mode. However, as power consumption is reduced the response time to touch increases.

The rest mode is a low power mode provided to save battery life. In rest mode, the device periodically looks for motion or touch at a rate programmed by rest rate registers and the responsiveness of the device is significantly reduced to save power. If the presence of a finger on the touchscreen is detected, processor or controller 100 shifts to run mode. In the absence of finger detection for a predetermined period of time, processor or controller 100 downshifts to the next slowest rest mode. Rest periods and downshift times are preferably programmable by firmware, and can be overridden via user register writes.

Continuing to refer to FIG. 16, according to one embodiment at steps 602 and 604 RUN MODE represents a normal, full speed, operational mode. Steps REST1 MODE through REST3 MODE represent power saving modes with progressively slower sample rates, which are selected to achieve a desired level of reduced power consumption. As shown in FIG. 16, mutual capacitance touch sensing system 110 starts out in RUN MODE. As long as a touch is detected before a predetermined period of time corresponding to REST1 DELAY has elapsed at step 610, mutual capacitance touch sensing system 110 remains in RUN MODE. If a touch has not been detected within such a predetermined period of time, mutual capacitance touch sensing system 110 enters REST1 MODE at step 614. Once again a timer is started, and if REST2 DELAY at step 620 elapses without a touch being detected, mutual capacitance touch sensing system 110 progresses into REST2 MODE. Once again, a timer is started and if no touches are detected, mutual capacitance touch sensing system 110 finally enters REST3 MODE at step 630. The time for transition can be adjusted to any desired value, but typically ranges between about 15 seconds and about 60 seconds.

If a touch is detected during any of the rest modes, mutual capacitance touch sensing system 110 may be configured to enter a provisional run mode (or PRE_RUN). In this mode, the system operates at the run mode sample rate, and keeps track of the number of cycles during which a touch is seen. Once a sufficient number of touches have been detected, mutual capacitance touch sensing mutual capacitance touch sensing system 110 resumes running in normal RUN MODE. If a predetermined period of time passes without a minimum number of touches having been detected with measured values corresponding thereto that have met or exceeded the threshold, mutual capacitance touch sensing system 110 returns to the most recent REST MODE in which it was operating previously.

Note that the various embodiments of touchscreen 90 disclosed herein, and the various embodiments of algorithms 210 through 600 depicted in FIGS. 6 through 16, operate in accordance with the principles of mutual capacitance.

Those skilled in the art will now understand that a virtually infinite number of different additions to, or combinations, permutations or modifications of, the steps included in algorithms 210 through 600 may be made without departing from the spirit and scope of the various embodiments of the invention. According to one embodiment, and with the aid of the information presented above and that depicted in FIGS. 1 through 16, processor or controller 100 and/or host controller 120 may be programmed or otherwise configured in a manner those skilled in the art will understand to execute a suitable algorithm in accordance with which to operate mutual capacitance touch sensing system 110. The various algorithms may be implemented in machine language or code, or any other suitable means, and stored in a machine readable volatile or non-volatile memory of processor or controller 100 such as EEPROM, ROM or RAM. Moreover, such algorithms may be executed, updated or modified in the field in a portable or other electronic device having processor or controller 100, mutual capacitance touch sensing system 110, and/or host controller 120 incorporated therein, or may be executed in a manufacturing facility before such a device is shipped.

Those skilled in the art will understand that processor or controller 100 and mutual capacitance touch sensing system 110 may be employed or incorporated into a number of different devices, including, but not limited to, an LCD, a computer display, a laptop computer, a personal data assistant (PDA), a mobile telephone, a radio, an MP3 player, a portable music player, a stationary device, a television, a stereo, an exercise machine, an industrial control, a control panel, an outdoor control device or a household appliance.

Note further that the various teachings presented herein may be applied to optically transmissive or non-optically-transmissive touchpads disposed, for example, on a printed circuit board, a flex circuit or board, or any other suitable substrate that may be incorporated into any of the above-described electronic devices.

While the primary use of processor or controller 100 and mutual capacitance touch sensing system 110 is believed likely to be in the context of relatively small portable devices, and touchpads or touchscreens therefore, it may also be of value in the context of larger devices, including, for example, keyboards associated with desktop computers or other less portable devices such as exercise equipment, industrial control panels, household appliances, and the like. Similarly, while many embodiments of the invention are believed most likely to be configured for manipulation by a user's fingers, some embodiments may also be configured for manipulation by other mechanisms or body parts. For example, the invention might be located on or in the hand rest of a keyboard and engaged by the heel of the user's hand. Furthermore, the invention is not limited in scope to drive electrodes disposed in rows and sense electrodes disposed in columns. Instead, rows and columns are interchangeable in respect of sense and drive electrodes.

Note further that included within the scope of the present invention are methods of making and having made the various components, devices, systems and methods described herein.

The above-described embodiments should be considered as examples of the present invention, rather than as limiting the scope of the invention. In addition to the foregoing embodiments of the invention, review of the detailed description and accompanying drawings will show that there are other embodiments of the present invention. Accordingly, many combinations, permutations, variations and modifications of the foregoing embodiments of the present invention not set forth explicitly herein will nevertheless fall within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of determining a touch area of a user's finger on a touch panel or touchpad in a mutual capacitance sensing device, comprising:
   (a) determining, in a processor of the sensing device, which center sense cell in the touch panel or touchpad is generating a highest touch point signal level and determining such highest touch point signal level;
   (b) determining touch point signal levels corresponding to cells adjacent to the center cell;
   (c) for those adjacent cells where signal levels corresponding thereto meet or exceed a predetermined percentage of the highest touch point signal level, designating such cells as touch cells together with the center cell, and
   (d) determining a touch area of the touch panel or touchpad on the basis of the touch cells.

2. The method of claim 1, wherein the adjacent cells are disposed vertically and horizontally to either side of the center cell.

3. The method of claim 2, further comprising determining a first value proportional to the number of horizontal touch cells having signal levels exceeding the threshold.

4. The method of claim 3, further comprising determining a second value proportional to the number of vertical touch cells having signal levels exceeding the threshold.

5. The method of claim 4, wherein the first and second values are scaled in respect of one another to produce a number representative of the touch area.

\* \* \* \* \*